(12) United States Patent
Adachi

(10) Patent No.: US 10,710,204 B2
(45) Date of Patent: Jul. 14, 2020

(54) NOZZLE CONTROLLER OF MACHINE TOOL

(71) Applicant: FANUC CORPORATION, Yamanashi (JP)

(72) Inventor: Hideaki Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 16/237,881

(22) Filed: Jan. 2, 2019

(65) Prior Publication Data

US 2019/0217434 A1 Jul. 18, 2019

(30) Foreign Application Priority Data

Jan. 12, 2018 (JP) .................................. 2018-003080

(51) Int. Cl.
*B23Q 11/00* (2006.01)
*B23Q 11/10* (2006.01)
(Continued)

(52) U.S. Cl.
CPC ........ *B23Q 11/0003* (2013.01); *B23Q 11/005* (2013.01); *B23Q 11/10* (2013.01);
(Continued)

(58) Field of Classification Search
CPC ... B23Q 11/0003; B23Q 11/005; B23Q 11/10; B23Q 11/1076; B23Q 17/22; B24B 5/02; B24B 55/02
See application file for complete search history.

(56) References Cited

U.S. PATENT DOCUMENTS 3,577,808 A * 5/1971 Visser ..................... B23P 25/00
408/61
3,868,195 A * 2/1975 Anderson .......... B23Q 11/1076
408/61
(Continued)

FOREIGN PATENT DOCUMENTS

CN 201471210 U 5/2010
JP S58149155 A 9/1983
(Continued)

OTHER PUBLICATIONS

An Office Action mailed by the Japanese Patent Office dated Aug. 20, 2019, which corresponds to Japanese Patent Application No. 2018-003080 and is related to U.S. Appl. No. 16/237,881; with English translation.

(Continued)

*Primary Examiner* — Dung Van Nguyen
(74) *Attorney, Agent, or Firm* — Studebaker & Brackett PC

(57) ABSTRACT

An object is to provide a nozzle controller which can constantly cool a tool in a machine tool. A nozzle controller of a machine tool includes: a tool which is gripped in a spindle of the machine tool; a nozzle in which the angle and/or the position thereof with respect to the tool can be changed and which emits a fluid to the tool; a nozzle drive unit which drives the angle and/or the position of the nozzle; a contact acquisition unit which acquires contact between the tool and a work; and a control unit which controls the nozzle drive unit. The control unit calculates, when the contact acquisition unit acquires the contact, based on a length of the tool and a stroke of a feed axis in the direction of the spindle, the angle and/or the position of the nozzle such that the fluid emitted from the nozzle hits a side surface (Continued)

of the tool, and controls the nozzle drive unit based on the result of the calculation.

6 Claims, 15 Drawing Sheets

(51) Int. Cl.
    *B23Q 17/22*     (2006.01)
    *B24B 5/02*     (2006.01)
    *B24B 55/02*     (2006.01)

(52) U.S. Cl.
    CPC .......... *B23Q 11/1076* (2013.01); *B23Q 17/22* (2013.01); *B24B 5/02* (2013.01); *B24B 55/02* (2013.01)

(56) References Cited

U.S. PATENT DOCUMENTS

| | | | | |
|---|---|---|---|---|
| 4,778,315 A * | 10/1988 | Duffy | ................... | B23Q 11/005 29/DIG. 78 |
| 8,784,022 B2 * | 7/2014 | Leishman | .............. | B23Q 11/10 409/136 |
| 9,238,287 B2 * | 1/2016 | Gardner | ............. | B23Q 11/1076 |
| 2003/0123940 A1 * | 7/2003 | Hubbard | ............ | B23Q 11/1084 408/1 R |
| 2006/0068683 A1 * | 3/2006 | Sudo | ....................... | B24B 7/228 451/5 |

FOREIGN PATENT DOCUMENTS

| | | |
|---|---|---|
| JP | S63232918 A | 9/1988 |
| JP | H04098545 U | 8/1992 |
| JP | H06-206139 A | 7/1994 |
| JP | H08-025171 A | 1/1996 |
| JP | 2002-018674 A | 1/2002 |

OTHER PUBLICATIONS

"Decision to Grant a Patent" Office Action issued in JP 2018-003080; mailed by the Japanese Patent Office dated Jan. 8, 2020.

\* cited by examiner

NOZZLE CONTROLLER OF MACHINE TOOL

BACKGROUND OF THE INVENTION

This application is based on and claims the benefit of priority from Japanese Patent Application No. 2018-003080, filed on 12 Jan. 2018, the content of which is incorporated herein by reference.

Field of the Invention

The present invention relates to a nozzle controller of a machine tool.

Related Art

Conventionally, a device is known which cools, in machining using a machine tool, a tool that is heated in the process of the machining. The tool is cooled, and thus the expansion and degradation of the tool caused by the heat are prevented, with the result that stable machining is performed.

As a device which effectively cools a tool of a machine tool, a device is known which emits a fluid such as a coolant to the tip of the tool (Patent Document 1). In this configuration, the coolant is supplied to the tool from a nozzle which is attached at a periphery of the tool. In order to supply the coolant to the tip of the tool, a nozzle controller is provided which directs the tip of the nozzle toward the tip of the tool.

Patent Document 1: Japanese Unexamined Patent Application, Publication No. H08-25171

SUMMARY OF THE INVENTION

However, in the configuration of Patent Document 1, when as in drilling, the tip of the tool enters the interior of a work, the coolant is not emitted to the tip of the tool. In other words, even when the coolant is emitted toward the direction of the tip of the tool, the coolant is blocked by the work so as not to reach the tool. As described above, depending on the type of machining, the tip of the tool is disadvantageously not cooled.

An object of the present invention is to provide a nozzle controller which can constantly cool a tool in a machine tool.

(1) A nozzle controller (for example, a nozzle controller 10 which will be described later) of a machine tool (for example, a machine tool 60 which will be described later) according to the invention of the present application includes: a tool (for example, a tool 12 which will be described later) which is gripped in a spindle (for example, a spindle 18 which will be described later) of the machine tool; a nozzle (for example, a nozzle 14 which will be described later) in which an angle and/or a position thereof with respect to the tool can be changed and which emits a fluid to the tool; a nozzle drive unit (for example, a nozzle drive unit 64 which will be described later) which drives the angle and/or the position of the nozzle; a contact acquisition unit which acquires contact between the tool and a work (for example, a work 30 which will be described later); and a control unit (for example, a control unit 66 which will be described later) which controls the nozzle drive unit, and the control unit calculates, when the contact acquisition unit acquires the contact, based on the length of the tool and the stroke of a feed axis in the direction of the spindle, the angle and/or the position of the nozzle such that the fluid emitted from the nozzle hits the side surface of the tool, and controls the nozzle drive unit based on the result of the calculation.

(2) Preferably, in the nozzle controller of the machine tool according to (1), the contact acquisition unit acquires the contact between the tool and the work based on a load of the spindle and/or the feed axis or the result of a three-dimensional machining simulation, the control unit stores, as the surface coordinate of the work, a coordinate in the direction of the spindle when the contact is detected and the nozzle drive unit drives, based on the surface coordinate, the angle and/or the position of the nozzle so as to direct the emitting port of the nozzle toward the surface coordinate.

(3) Preferably, in the nozzle controller of the machine tool according to (1), the contact acquisition unit acquires the contact between the tool and the work, the control unit stores, as a surface coordinate of the work, a coordinate in the direction of the spindle when the contact is detected, the control unit determines that the tool is raised or lowered when the stroke of the feed axis in the direction of the spindle is increased or decreased after the detection of the contact and a stroke in a direction orthogonal to the direction of the spindle is not produced, and the nozzle drive unit holds the nozzle such that the emitting port of the nozzle is directed toward the surface coordinate.

(4) Preferably, in the nozzle controller of the machine tool according to (3), when the control unit determines that the tool is raised or lowered and a tip portion of the tool is located in a position higher than the surface of the work, the control unit calculates the range of angles and/or the range of positions of the nozzle in the direction of the spindle such that the fluid hits the side surface of the tool and the nozzle drive unit drives the nozzle according to the range of angles and/or the range of positions.

(5) Preferably, in the nozzle controller of the machine tool according to any one of (1) to (4), based on the diameter of the tool, the control unit compensates the angle and/or the position of the nozzle which is calculated.

(6) Preferably, in the nozzle controller of the machine tool according to any one of (1) to (5), the control unit is provided independently of a machining program production device which produces a machining program for the machine tool and/or a numerical controller (for example, a CNC 62 which will be described later) of the machine tool.

(7) Preferably, in the nozzle controller of the machine tool according to any one of (1) to (6), the control unit is provided independently of a plurality of the machine tools and controls the nozzle drive units of the machine tools.

According to the present invention, it is possible to provide a nozzle controller which can constantly cool a tool in a machine tool.

DETAILED DESCRIPTION OF THE INVENTION

Figure 1:
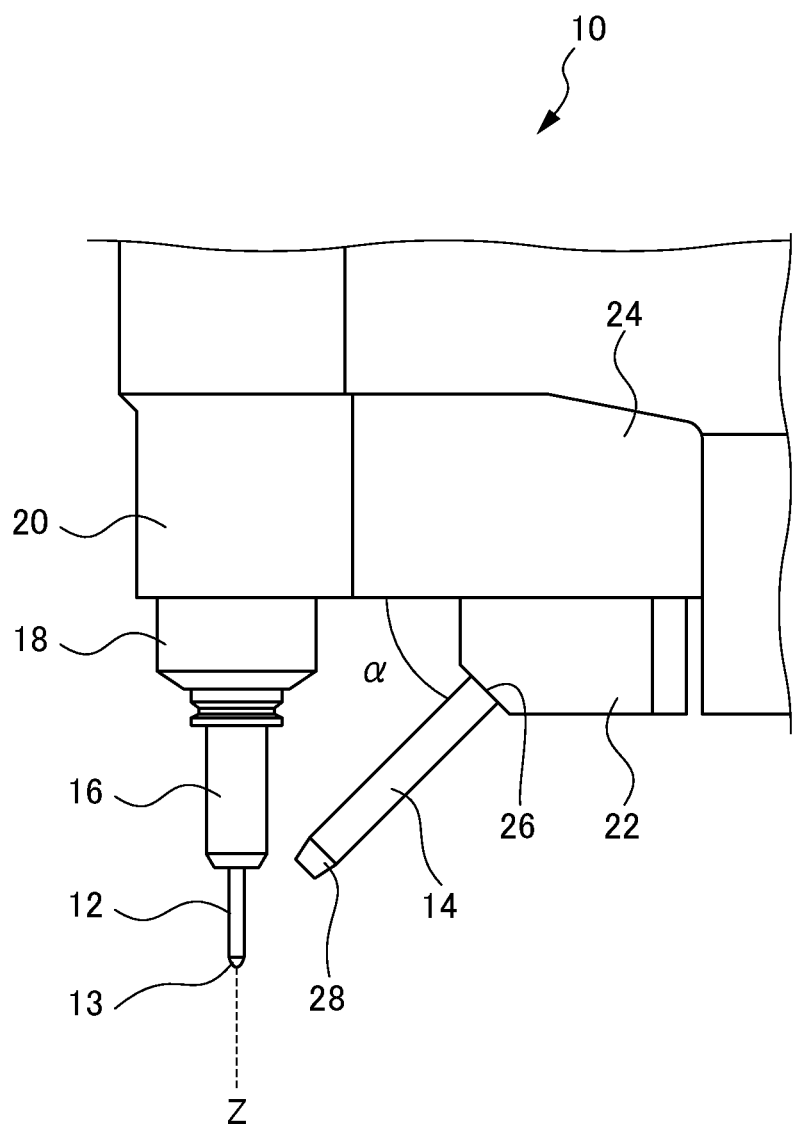
FIG. 1 is an external view of a nozzle controller according to a first embodiment of the present invention.

Embodiments of the present invention will be described below with reference to drawings. FIG. 1 is an external view of a nozzle controller 10 according to a first embodiment. The nozzle controller 10 includes a control unit, a nozzle drive unit, a tool 12 and a nozzle 14 that is attached at a periphery of the tool 12, all of which will be described later.

The tool 12 is gripped in a tool holder 16. The tool holder 16 is fixed via a spindle 18 to a spindle head 20. It is assumed that the direction of the spindle is a Z axis and that the Z axis coordinate value of the initial position of the spindle head 20 is zero. The spindle head 20 is fed out as a feed axis is moved. Specifically, the tool 12 fixed to the spindle head 20 is fed downward according to the stroke of the feed axis. As the spindle head 20 is fed out and the tool 12 is fed downward, the coordinate value in the Z axis is reduced. The coordinate value in the direction of the Z axis is increased or decreased according to the stroke of the feed axis. A work (unillustrated) is placed below the tool tip portion 13 of the tool 12.

The nozzle 14 emits a fluid to the tool 12. The nozzle 14 is attached via a nozzle base portion 22 to a nozzle support portion 24. In the nozzle 14, an angle with respect to the tool 12 can be changed. The nozzle 14 is swung by the nozzle drive unit which will be described later with the nozzle attachment end 26 of the nozzle base portion 22 serving as a pivot. As the nozzle 14 is swung, the emitting port of the nozzle 14 is moved so as to draw an arc about the nozzle attachment end 26. The direction of the emitting port of the nozzle 14 is determined by an aim angle α. The aim angle α is an angle which is formed by the horizontal surface of the nozzle support portion 24 and the surface of the nozzle 14 in the longitudinal direction thereof. The aim angle α is determined by the control unit which will be described later.

The nozzle support portion 24 is integrally formed with the spindle head 20. The position of the nozzle attachment end 26 of the nozzle 14 is fixed relative to the nozzle support portion 24. In other words, the Z axis coordinates of the spindle head 20 and the nozzle attachment end 26 are linked.

Figure 2:
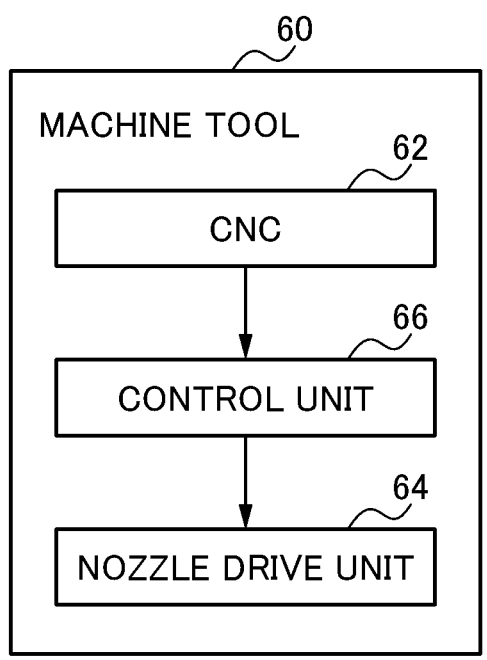
FIG. 2 is a functional block diagram of the nozzle controller according to the first embodiment of the present invention.

FIG. 2 is a functional block diagram of the nozzle controller 10 according to the first embodiment. The control unit 66 is provided independently of a CNC (numerical controller) 62. The CNC 62 transmits information on the stroke of the feed axis in the direction of the Z axis to the control unit 66. The control unit 66 calculates the aim angle based on information on the stroke and the length of the tool held as offset data.

As will be described in detail below, the aim angle is an angle at which a coolant is appropriately emitted to the side surface or the tip of the tool 12 (see FIG. 1). The control unit 66 sends a command corresponding to the aim angle to the nozzle drive unit 64. The nozzle drive unit 64 drives the nozzle 14 according to the command so as to compensate the aim angle.

FIG. 3 is a schematic view of a nozzle tip portion 28 and the tool 12 in the first embodiment. In the first embodiment, contact between the tool tip portion 13 and the work 30 is detected. The aim angle is compensated according to whether or not the contact is made.

Figure 3A:
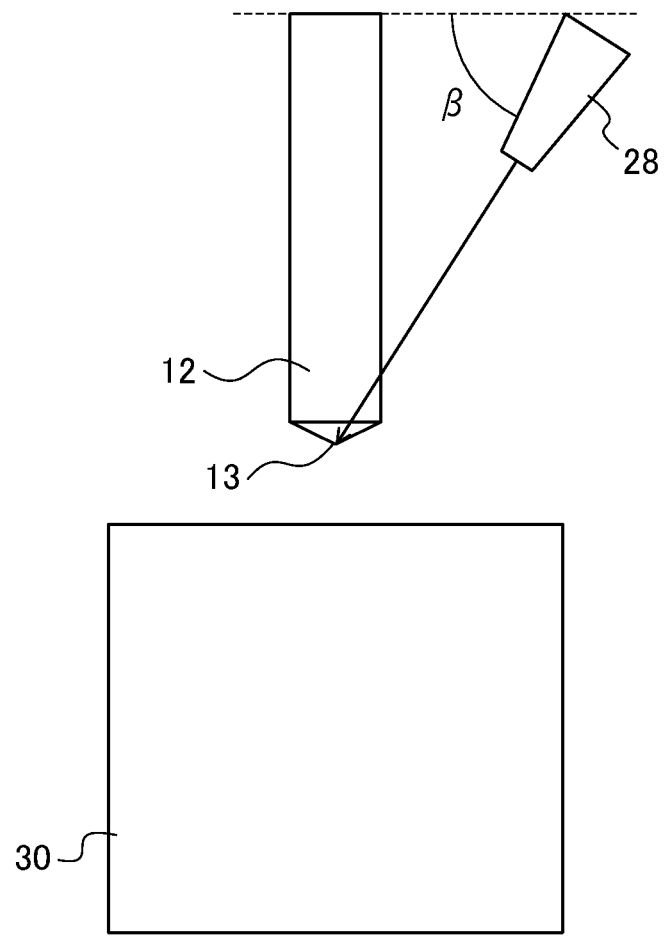
FIG. 3A is a schematic view of a nozzle tip portion and a tool according to the first embodiment of the present invention.

FIG. 3A shows a state before machining is started. Before the start of the machining, the tool tip portion 13 does not reach the work 30. The emitting port of the nozzle tip portion 28 is directed toward the tool tip portion 13. Here, the aim angle is β. An arrow indicates a direction in which the coolant is emitted from the emitting port of the nozzle tip portion 28.

Figure 3B:
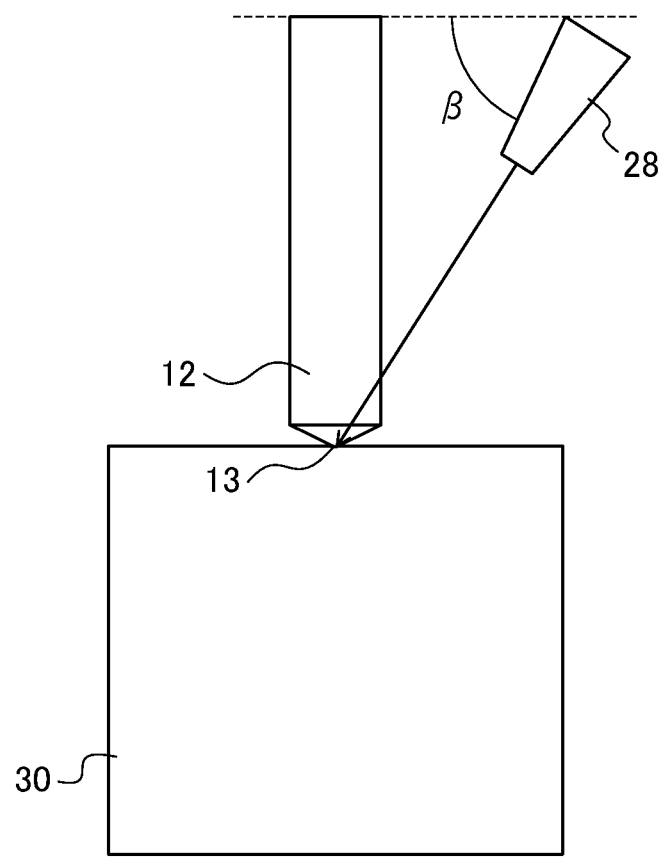
FIG. 3B is a schematic view of the nozzle tip portion and the tool according to the first embodiment of the present invention.

FIG. 3B shows a state when the machining is started. When the machining is started, the tool tip portion 13 reaches the work 30. The control unit 66 (see FIG. 2) stores a Z axis coordinate when the contact is detected as the surface coordinate of the work 30 according to the length of the tool 12 and the stroke of the feed axis in the direction of the Z axis. The contact detection is performed based on the load of a motor for the spindle and/or the feed axis or the result of a three-dimensional machining simulation. The three-dimensional machining simulation is performed in, for example, the CNC 62 (see FIG. 2).

Figure 3C:
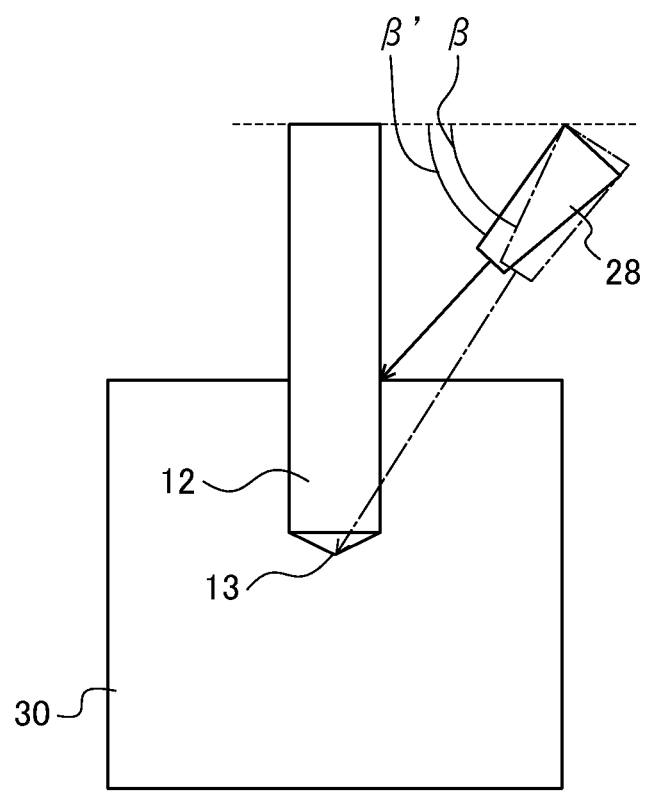
FIG. 3C is a schematic view of the nozzle tip portion and the tool according to the first embodiment of the present invention.

FIG. 3C shows a state when the machining is being performed. During the machining, the tool tip portion 13 enters the interior of the work 30. Here, when the emitting port of the nozzle tip portion 28 is kept at an aim angle β such that the emitting port is directed toward the tool tip portion 13, the coolant is emitted not to the tool tip portion 13 but to the work 30 (see broken lines).

Hence, the control unit 66 (see FIG. 2) calculates, based on the stored surface coordinate, a compensated angle β' such that the emitting port of the nozzle tip portion 28 is directed toward the side surface of the tool 12 in the direction of the Z axis. The nozzle drive unit 64 compensates the angle of the nozzle tip portion 28 according to the calculated compensated angle β'. For example, as shown in the figure, the compensated angle β' may be an angle such that the coolant is emitted to the surface coordinate.

As described above, in the first embodiment, when the contact is detected, the aim angle is compensated, and thus even when the machining is being performed, the coolant is emitted to the side surface of the tool 12. The coolant emitted to the side surface reaches the tool tip portion 13 along the side surface. In this way, the tool 12 can be constantly cooled. Since the coolant is emitted to the tool 12 without any waste, the amount of coolant used is reduced. Furthermore, the life of the tool and the quality of the machined surface are enhanced.

FIG. 4 is a schematic view of a nozzle tip portion 28 and a tool 12 according to a second embodiment. In the second embodiment, in addition to the first embodiment, the raising/lowering operation of the tool 12 is determined. The aim angle is compensated according to whether or not the raising/lowering operation is performed.

Figure 4A:
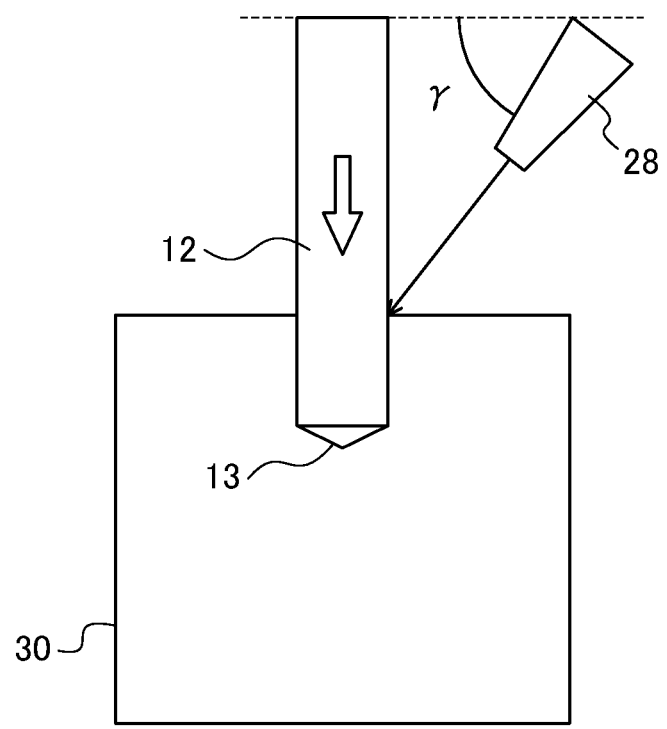
FIG. 4A is a schematic view of a nozzle tip portion and a tool according to a second embodiment of the present invention.

FIG. 4A shows a state where the machining is being performed. An operation during the machining is as described above with reference to FIG. 1C. Here, the emitting port of the nozzle tip portion 28 is assumed to be directed toward the surface coordinate of the work 30. Here, the aim angle is γ. The coolant is emitted to the side surface of the tool 12.

Figure 4B:
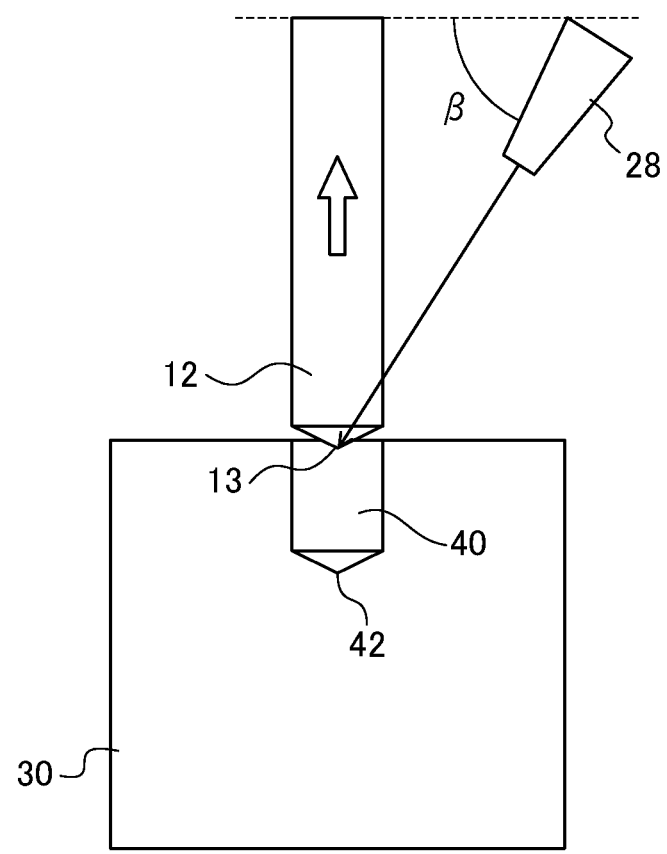
FIG. 4B is a schematic view of the nozzle tip portion and the tool according to the second embodiment of the present invention.

FIG. 4B shows a state where the tool 12 is raised after the completion of the machining. When the stroke of a feed axis in the direction of the Z axis is increased or decreased after the detection of the contact, the control unit 66 (see FIG. 2) detects that the tool 12 is raised after reaching a bottom portion 42 of a borehole 40. Then, when the control unit 66 determines that based on the stored surface coordinate, the tool tip portion 13 is raised upward from the surface of the work 30, the control unit 66 sends a command to compensate the aim angle to β such that the emitting port of the nozzle tip portion 28 is directed toward the tool tip portion 13. When the nozzle drive unit 64 which receives the command drives the nozzle such that the aim angle is changed from γ to β, the coolant is emitted to the tool tip portion 13.

Figure 4C:
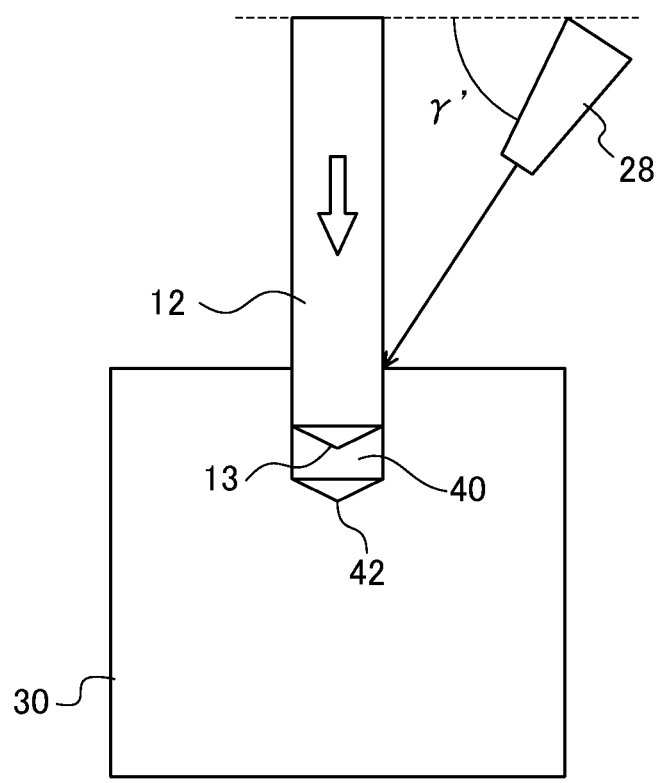
FIG. 4C is a schematic view of the nozzle tip portion and the tool according to the second embodiment of the present invention.

FIG. 4C shows a state where the tool 12 enters the same borehole 40 again. When the stroke of the feed axis in the direction of the Z axis is increased or decreased after the detection of the contact, and a stroke in a direction orthogonal to the direction of the Z axis is not produced, the control unit 66 (see FIG. 2) determines that the tool 12 is raised or lowered. Here, the nozzle drive unit 64 (see FIG. 2) is held at an aim angle such that the emitting port of the nozzle tip portion 28 is directed toward the surface coordinate. An aim angle γ' shown in the figure illustrates one passage point while the tool 12 is being lowered. In this way, the coolant is emitted to the side surface of the tool 12.

As described above, in the second embodiment, in addition to the effect of the first embodiment, even when the tool 12 is raised and lowered, for example, when chips are removed, the tool 12 is constantly cooled.

FIG. 5 is a schematic view of a nozzle tip portion 28 and a tool 12 according to a third embodiment. The third embodiment differs from the second embodiment in that the tool 12 is washed by the swinging of the nozzle tip portion 28.

Figure 5A:
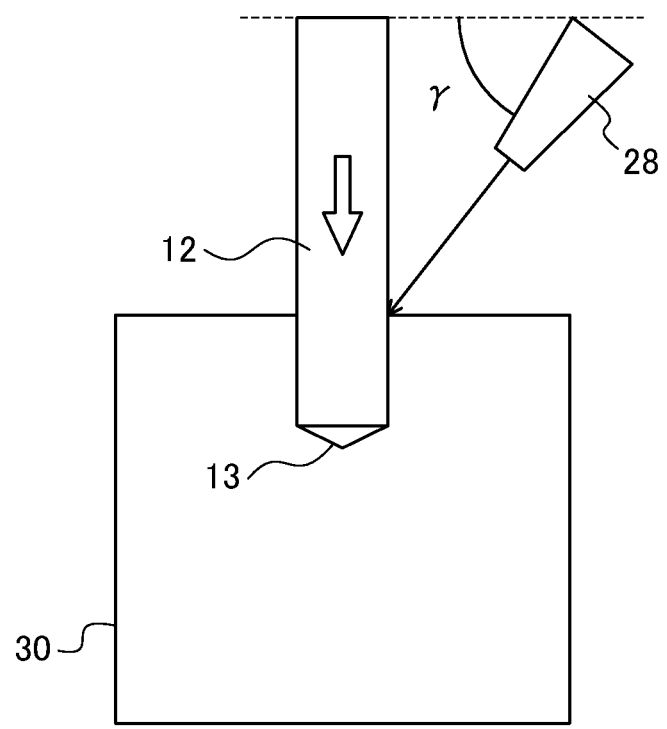
FIG. 5A is a schematic view of a nozzle tip portion and a tool according to a third embodiment of the present invention.
Figure 5B:
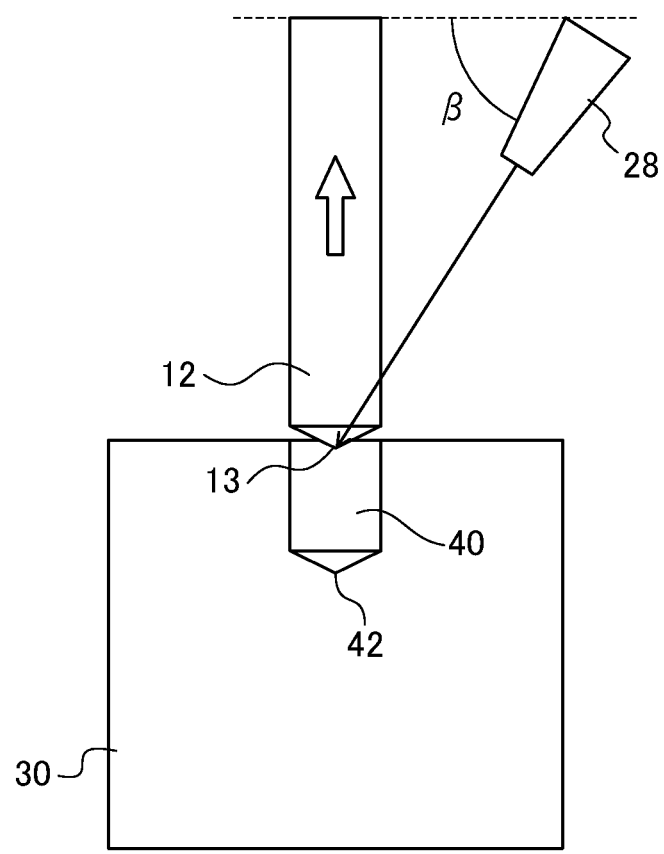
FIG. 5B is a schematic view of the nozzle tip portion and the tool according to the third embodiment of the present invention.
Figure 5C:
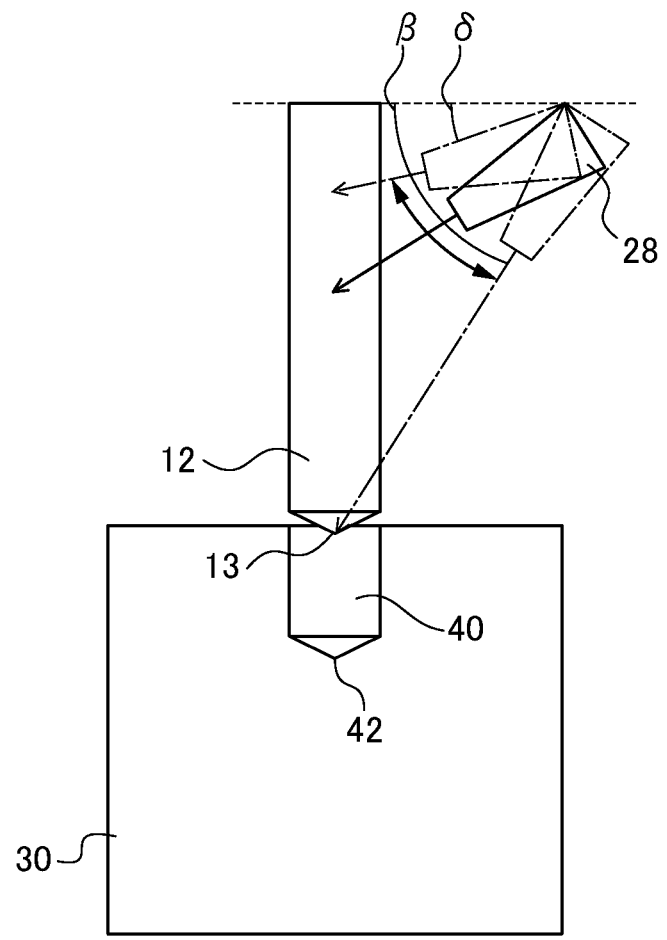
FIG. 5C is a schematic view of the nozzle tip portion and the tool according to the third embodiment of the present invention.

An operation shown in FIGS. 5A and 5B is the same as that shown in FIGS. 4A and 4B. FIG. 5C is a diagram illustrating the operation of the washing. The washing operation is performed when the control unit 66 (see FIG. 2) determines that the tool 12 is raised or lowered and that the tool tip portion 13 is located higher than the surface of the work 30. The control unit 66 calculates a range of angles of the swinging. The range of angles may be determined according to the length of the tool 12. Here, the range of angles is between β and δ. The nozzle drive unit 64 drives and swings the nozzle tip portion 28 such that the aim angle is between β and δ. In this way, chips adhered to the tool 12 are removed.

As described above, in the third embodiment, the chips adhered to the tool 12 are removed. In this way, in addition to the effect of the second embodiment, an effect of constantly keeping machining accuracy is obtained.

Figure 6:
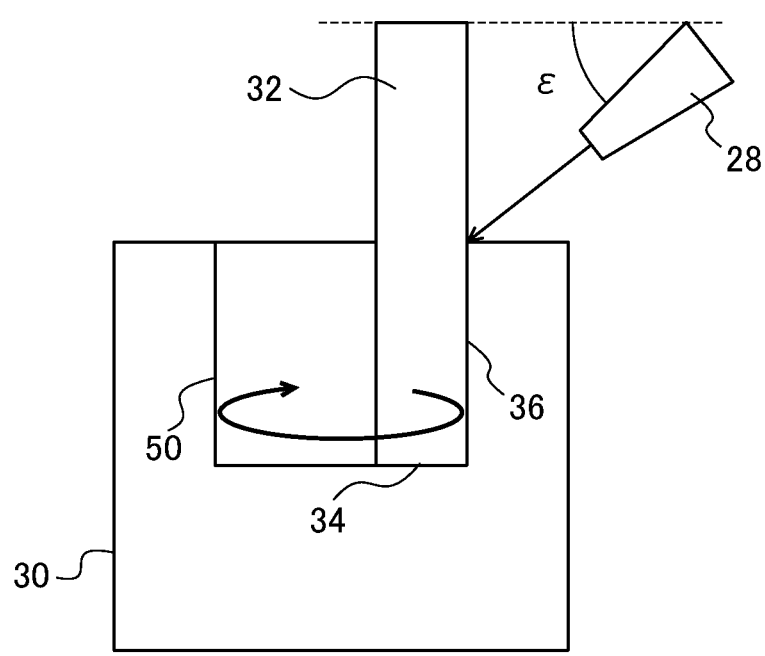
FIG. 6 is a schematic view of a nozzle tip portion and a tool according to a fourth embodiment of the present invention.

FIG. 6 is a schematic view of a nozzle tip portion and a tool in a fourth embodiment. FIG. 6 is a diagram showing so-called helical machining. The fourth embodiment differs from the first to third embodiments in that a tool 32 is substituted for the tool 12.

The tool 32 is, for example, a tool called a flat end mill whose tip is flat. The tool 32 enters the work 30 in the direction of the Z axis while being turned on an X-Y plane orthogonal to the Z axis. While a tip surface 34 is cutting the surface of the work 30, the side surface 36 of the tool 32 cuts the interior of the work 30, and thus a borehole 50 is formed.

The nozzle tip portion 28 follows the movement of the tool 32. In the fourth embodiment, the control unit 66 in the first to third embodiments substitutes the Z axis coordinate of the tip surface 34 of the tool 32 for the Z axis coordinate of the tool tip portion 13 and thereby calculates an aim angle ε. In other words, as in the first to third embodiments, the detection of the contact of the tool 32, the determination of the raising/lowering operation and the washing operation are performed. Hence, even in the fourth embodiment, before the start of the machining until the completion of the machining, the coolant is emitted to the tip surface 34 or the side surface 36 of the tool 32, and thus the tool 32 is constantly cooled.

Figure 7:
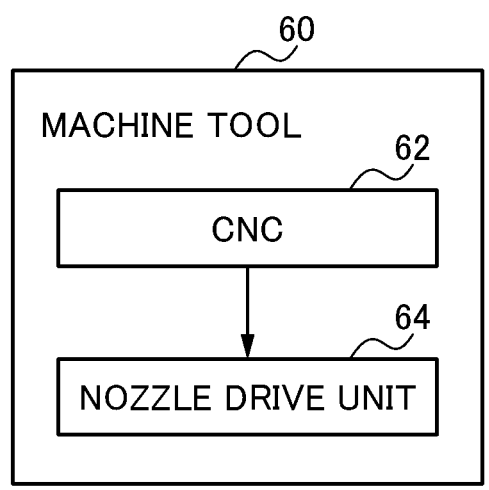
FIG. 7 is a functional block diagram of a nozzle controller according to a fifth embodiment of the present invention.

FIG. 7 is a functional block diagram of a nozzle controller according to a fifth embodiment. A control unit 66 (see FIG. 2) is incorporated into the CNC 62 of a machine tool. The CNC 62 controls the stroke of a feed axis in the direction of the Z axis. The CNC 62 determines an aim angle based on the stroke in the direction of the Z axis and information on the length of a tool 12 (see FIG. 1) held as offset data, and sends a command corresponding to the aim angle to a nozzle drive unit 64. The nozzle drive unit 64 which receives the command drives the nozzle 14 so as to compensate the aim angle. In the fifth embodiment, the result of a three-dimensional machining simulation performed in the CNC 62 can be applied to the detection of the contact.

Figure 8:
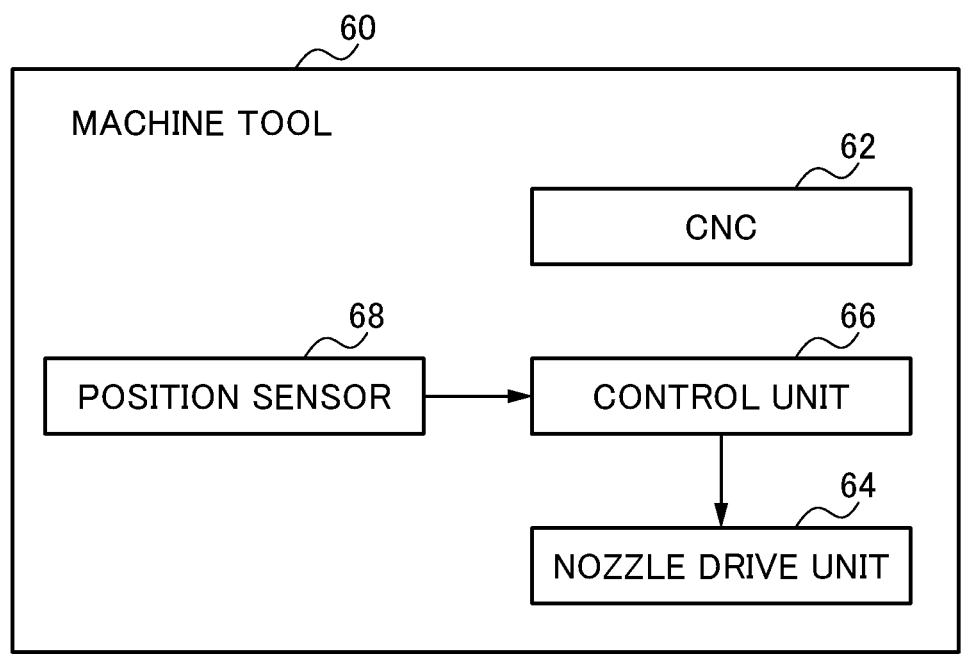
FIG. 8 is a functional block diagram of a nozzle controller according to a sixth embodiment of the present invention.

FIG. 8 is a functional block diagram of a nozzle controller according to a sixth embodiment. In the sixth embodiment, a CNC (numerical controller) 62 and/or a machining program production device (unillustrated) which produces a machining program for a machine tool is independent of the control unit 66. The control unit 66 acquires the length of a tool 12 (see FIG. 1) held as offset data and the stroke of a feed axis in the direction of the Z axis from a position sensor 68 which is formed with a servo motor or the like attached to the feed axis. The control unit 66 determines an aim angle based on the stroke so as to send a command based on the aim angle to a nozzle drive unit 64. The nozzle drive unit 64 compensates the aim angle according to the command. In this configuration, the nozzle controller can be added later to a machine tool 60 which includes the existing CNC 62.

Figure 9:
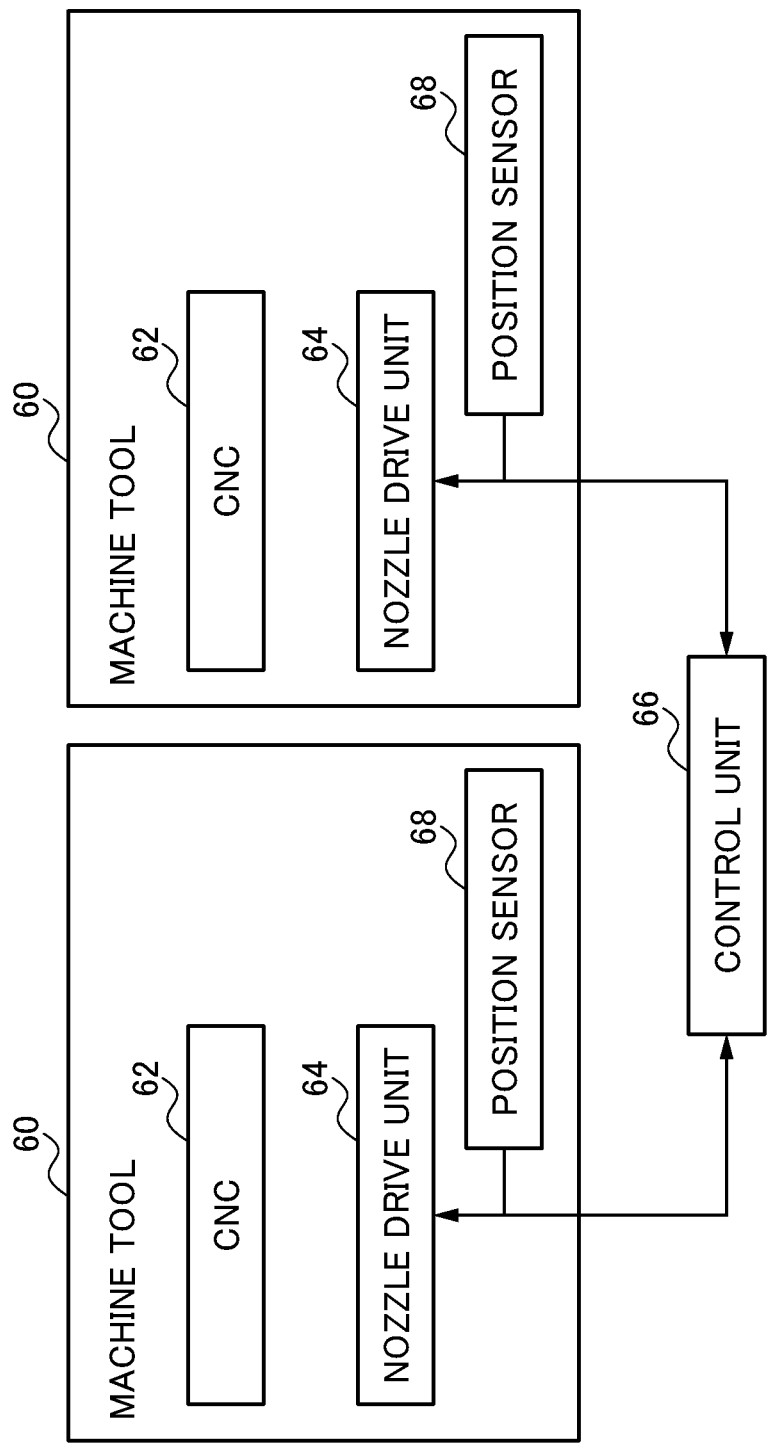
FIG. 9 is a functional block diagram of a nozzle controller according to a seventh embodiment of the present invention.

FIG. 9 is a functional block diagram of a nozzle controller according to a seventh embodiment. In the seventh embodiment, a control unit 66 is provided independently of individual machine tools 60. The control unit 66 acquires the stroke of a feed axis in the direction of the Z axis from position sensors 68 which are provided in the individual machine tools 60. The control unit 66 sends, to nozzle drive units 64 of the individual machine tools 60, commands according to aim angles that are determined based on the strokes and the lengths of tools in the individual machine tools 60. The nozzle drive units 64 compensates the aim angles according to the commands.

As described above, in the seventh embodiment, by the one control unit 66, the aim angles of a plurality of machine tools 60 can be controlled. In this way, the number of control units 66 is reduced, and thus the manufacturing cost of the machine tools 60 can be reduced.

The detection of the contact described above may be performed based on a variation in sound pressure in the vicinity of the spindle or vibrations in the machine tool 60. Although in the embodiments described above, the aim angle is determined with the assumption that the diameter of the tool is ideally zero, in this case, the coolant is emitted to a position higher than a position acquired with consideration given to the actual diameter. In order to determine a more accurate aim angle, the control unit 66 may further use information on the diameter of the tool 12 (see FIG. 1).

Although in the embodiments described above, the spindle head 20 and the nozzle support portion 24 shown in FIG. 1 are integrally formed, the relative positions of the spindle head 20 and the nozzle support portion 24 do not need to be fixed. In other words, the tool 12 and the nozzle 14 do not need to be raised and lowered in a coordinated manner. In this case, the Z axis coordinate of the spindle head 20 and the Z axis coordinate of the nozzle attachment end 26 are not linked. Hence, the control unit 66 (see FIG. 2) determines the aim angle and the position on the Z axis or the range of positions of the nozzle tip portion 28 based on the length of the tool and the stroke of the feed axis in the direction of the Z axis.

EXPLANATION OF REFERENCE NUMERALS 10 nozzle controller
12 tool
14 nozzle
18 spindle
64 nozzle drive unit
66 control unit

What is claimed is:

1. A nozzle controller of a machine tool comprising: a tool which is gripped in a spindle of the machine tool;
   a nozzle in which an angle and/or a position thereof with respect to the tool can be changed and which emits a fluid to the tool;
   a nozzle drive unit which drives the angle and/or the position of the nozzle;
   a contact acquisition unit which acquires contact between the tool and a work; and
   a control unit which controls the nozzle drive unit,
   wherein the control unit stores, as a surface coordinate of the work, a coordinate in the direction of the spindle when the contact acquisition unit detects the contact, and further determines that the tool is raised or lowered when the stroke of the feed axis in the direction of the spindle is increased or decreased after the detection of the contact by the contact acquisition unit and a stroke in a direction orthogonal to the direction of the spindle is not produced, and
   the nozzle drive unit drives the nozzle such that an emitting port of the nozzle is directed to the surface coordinate when the control unit determines that the tool is raised or lowered.

2. The nozzle controller of the machine tool according to claim 1, wherein the contact acquisition unit acquires the contact between the tool and the work based on a result of a three-dimensional machining simulation.

3. The nozzle controller of the machine tool according to claim 1, wherein when the control unit determines that the tool is raised or lowered and a tip portion of the tool is located in a position higher than a surface of the work, the control unit calculates a range of angles and/or a range of positions of the nozzle in the direction of the spindle such that the fluid hits a side surface of the tool, and
   the nozzle drive unit drives the nozzle to swing according to the range of angles and/or the range of positions when the control unit calculates the range of angles and/or the range of positions of the nozzle.

4. The nozzle controller of the machine tool according to claim 1, wherein based on a diameter of the tool, the control unit compensates the angle and/or the position of the nozzle which is calculated.

5. The nozzle controller of the machine tool according to claim 1, wherein the control unit is provided independently of a machining program production device which produces a machining program for the machine tool and/or a numerical controller of the machine tool.

6. The nozzle controller of the machine tool according to claim 1, wherein the control unit is provided independently of a plurality of the machine tools and controls the nozzle drive units of the machine tools.

* * * * *